W. H. SPURLIN.
MOTH-TRAPS FOR BEE-HIVES.
No. 170,601. Patented Nov. 30, 1875.
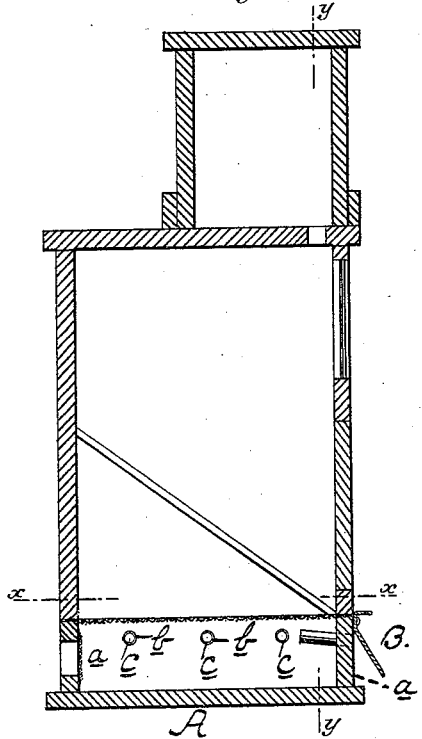
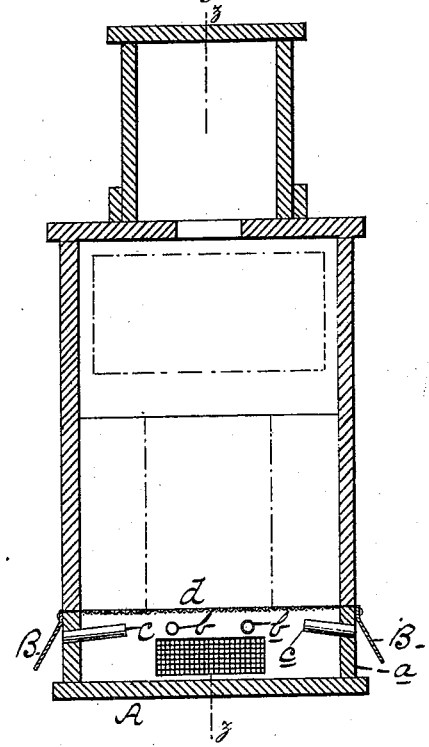
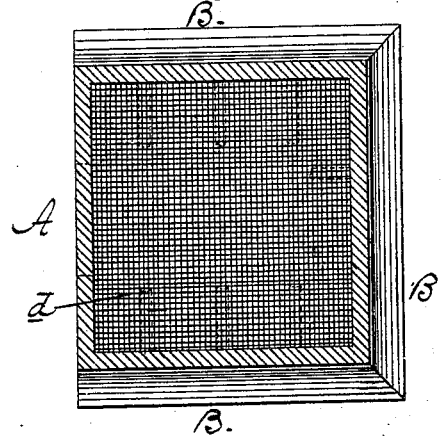
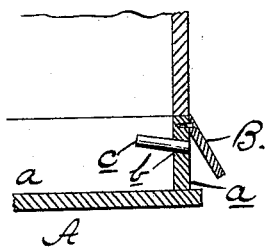
Witnesses:
Inventor:
William H. Spurlin.
Per James L. Norris,
Atty.

UNITED STATES PATENT OFFICE.

WILLIAM H. SPURLIN, OF HAWKINSVILLE, GEORGIA.

IMPROVEMENT IN MOTH-TRAPS FOR BEE-HIVES.

Specification forming part of Letters Patent No. 170,601, dated November 30, 1875; application filed October 17, 1873.

*To all whom it may concern:*

Be it known that I, WILLIAM H. SPURLIN, of Hawkinsville, in the county of Pulaski and State of Georgia, have invented certain new and useful Improvements in Moth-Traps for Bee-Hives, of which the following is a specification:

This invention relates to moth-traps for bee-hives which possess a series of tubes extending through the sides of a box, and the top of the box being covered in any suitable manner, preferably with wire-gauze, by which means the interior of the same may be inspected.

The object of the invention is to render said moth-trap more effectual; and to this end it consists in providing the upper edge of the box with a downwardly-inclined projecting protector or shield, which conceals the tubes from view, and prevents the moths or roaches from gaining access to the hive, and also prevents the bees from entering the moth-trap, all of which will be fully hereinafter described.

In the accompanying drawings, Figure 1 represents a vertical section of my invention applied to a bee-hive; Fig. 2, a similar view of the same; and Figs. 3 and 4, detached views.

The moth-trap A is preferably of a rectangular form, so as to suit hives of the ordinary shape, and its walls *a* are provided with openings *b*, into which are inserted metal or other tubes *c*. The top of the box is covered preferably with a wire-gauze, *d*, or of other foraminous material, by which means the interior of the trap may be inspected. At the upper edge of the box or trap A is securely fastened downwardly-projecting protectors B, which may be made either of metal or wood, with one corner beveled off, by which means, when said beveled edge is secured to the box, the protector will be inclined outwardly, and create between itself and the trap a V-shaped space. By this means the mouth of the tubes *c* are concealed from view, and when the flies or moths make for the hive they will endeavor to enter the same at the bottom, and, on passing up the side walls, will enter the tubes *c*, and pass into the moth-trap, from which they cannot escape.

The object of my inclined protector B is to prevent the moths and flies from gaining access to the opening through which the bees enter the hive, and at the same time prevent the bees entering the moth-trap, which they invariably do in the traps as ordinarily constructed. A further function of this shield or protector is, that it so darkens the mouth of the tubes that anything having entered said tubes will not attempt to escape by them.

The moth-trap, constructed as above described, is passed into a chamber made in the lower part of the hive; or the latter may be merely placed or set on it. In the former case I prefer to make the trap of a somewhat smaller size than the chamber, and retain it in the latter by means of spring-catches or otherwise. If the box and chamber are of one size there is liability of the box swelling or expanding when wet, and hence great trouble in removing the same.

The moth-trap may be used in connection with any of the well-known bee-hives, and can be made of any form to suit all constructions.

In some instances I intend providing the upper edge of the protector or shield with an outwardly-projecting flange, *e*, which will prevent the moth from gaining access to the hive, should it by any possible means get upon the top surface of the protector. This construction is especially intended when the protector is made of metal.

I do not claim a platform for bees to rest upon, arranged above the opening where the bees enter the hive, for such is old and well known.

Having thus fully described my invention, what I claim as new, and desire to secure by Letters Patent, is—

As a new article of manufacture, a moth-trap to be attached to a bee-hive, consisting of the box A, provided with the downwardly-inclined moth-stop B and moth-entrance tubes *c*, the top of the box A being closed by a reticulated cover, *d*.

In testimony that I claim the foregoing I have hereunto set my hand.

WILLIAM H. SPURLIN.

Witnesses:
NATHAN H. MOBLEY,
ELISHA B. ROYAL.